United States Patent [19]
Birke et al.

[11] 3,930,794
[45] Jan. 6, 1976

[54] PROCESS FOR THE DYEING OF SYNTHETIC FIBER MATERIALS FROM ORGANIC SOLVENTS

[75] Inventors: Walter Birke; Rudolf Schickfluss; Franz Schön, all of Frankfurt am Main; Willi Steckelberg, Hofheim, Taunus, all of Germany

[73] Assignee: Hoechst Aktiengesellschaft, Frankfurt am Main, Germany

[22] Filed: Oct. 19, 1973

[21] Appl. No.: 408,075

[30] Foreign Application Priority Data
Oct. 21, 1972 Germany............................ 2251704

[52] U.S. Cl................ 8/41 B; 8/41 R; 8/41 A; 8/41 C; 8/41 D; 8/50; 260/174; 260/185; 260/189; 260/190; 260/191
[51] Int. Cl.².. C08K 5/23; C09B 43/18; D06P 1/04
[58] Field of Search............ 8/173, 174, 41 A, 41 B, 8/41 C, 41 D, 41 R, 6; 260/174, 189, 190, 191, 185

[56] References Cited
UNITED STATES PATENTS

| | | | |
|---|---|---|---|
| 1,738,978 | 11/1929 | Whitehead............................ | 8/173 X |
| 2,691,027 | 10/1954 | Grossmann et al...................... | 8/6 X |
| 2,888,452 | 5/1959 | Schmid et al......................... | 8/6 X |
| 3,663,161 | 5/1972 | Litzler et al......................... | 8/174 |
| 3,684,431 | 8/1972 | Bischof et al........................ | 8/137 |
| 3,738,803 | 6/1973 | Blanc et al.......................... | 8/174 X |

FOREIGN PATENTS OR APPLICATIONS

| | | | |
|---|---|---|---|
| 525,042 | 8/1940 | United Kingdom....................... | 8/6 |
| 1,288,063 | 10/1969 | Germany | |

*Primary Examiner*—Benjamin R. Padgett
*Assistant Examiner*—David Leland
*Attorney, Agent, or Firm*—Curtis, Morris & Safford

[57] ABSTRACT

A process for the continuous dyeing of textile materials containing or consisting of synthetic fibrous materials from organic solvents, which comprises impregnating the said textile materials with an organic dyebath containing at least one dyestuff of the formula

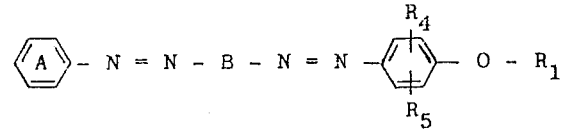

in which the phenyl radical A is unsubstituted or substituted by 1 to 3 substituents of the group consisting of halogen, nitro, cyano, trifluoromethyl, lower alkyl, lower alkoxy and lower alkoxy-lower alkylene—O—, B represents naphthylene or

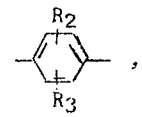

$R_2$, $R_3$, $R_4$ and $R_5$ each represent hydrogen, halogen, lower alkyl, lower alkoxy or lower alkoxy-lower alkylene—O—, and $R_1$ stands for a linear or branched alkylcarbonyl of at most 18 carbon atoms,

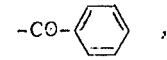

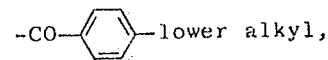

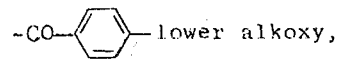

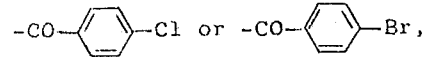

and an organic solvent, and fixing the dyestuffs by submitting the impregnated materials to a heat treatment.

8 Claims, No Drawings

PROCESS FOR THE DYEING OF SYNTHETIC FIBER MATERIALS FROM ORGANIC SOLVENTS

We have found that valuable fast dyeings can be produced in continuous manner on textile materials consisting of, or containing, synthetic fibers by impregnating the said textile materials with organic dyeing liquors which contain dyestuffs of the general formula (1)

$$A - N = N - B - N = N - C - O - R_1 \qquad (1)$$

in which A represents a benzene radical which may contain up to 3 substituents from the series of halogen atoms, preferably chlorine or bromine atoms, nitro, cyano, trifluoromethyl and alkyl groups preferably containing 1 to 4 carbon atoms and alkoxy groups preferably containing 1 to 4 carbon atoms optionally substituted by alkoxy groups containing 1 to 4 carbon atoms, B represents the radical

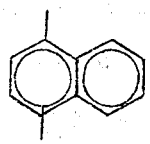

or the radical of the formula (2)

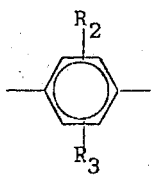

(2)

in which $R_2$ and $R_3$, independently of each other, represent hydrogen atoms, halogen atoms, preferably chlorine or bromine atoms, and/or alkyl groups preferably containing 1 to 4 carbon atoms and/or alkoxy groups preferably containing 1 to 4 carbon atoms optionally substituted by alkoxy groups containing 1 to 4 carbon atoms, C represents a radical of the formula (3)

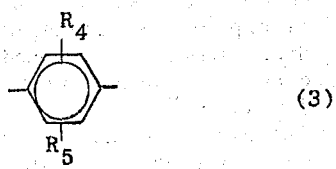

(3)

in which $R_4$ and $R_5$, independently of each other, represent hydrogen atoms, halogen atoms, preferably chlorine or bromine atoms, and/or alkyl groups preferably containing 1 to 4 carbon atoms and/or alkoxy groups preferably containing 1 to 4 carbon atoms optionally substituted by alkoxy groups containing 1 to 4 carbon atoms, and $R_1$ represents a branched or unbranched alkylcarbonyl radical or an arylcarbonyl radical optionally substituted by alkyl or alkoxy groups containing 1 to 4 carbon atoms or by halogen atoms, preferably chlorine or bromine atoms, $R_1$ containing at most 18 carbon atoms, and subsequently fixing the dyestuffs by a heat treatment.

The dyestuffs which are preferably used in the process of the invention are those which correspond to the general formula (4)

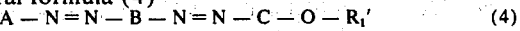

in which A, B and C have the meanings given above and $R_1'$ represents alkylcarbonyl groups of preferably 5 to 10 carbon atoms.

The dyestuffs which are most preferably used in the process of the invention are those which correspond to the general formula (5)

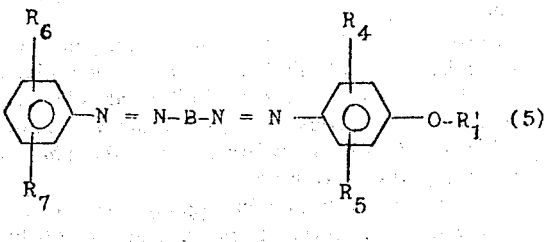

in which B, $R_1'$, $R_4$ and $R_5$ have the meanings given above and $R_6$ and $R_7$, independently of each other, represent hydrogen atoms or halogen atoms, preferably chlorine or bromine atoms, alkyl or alkoxy groups of 1 to 4 carbon atoms.

With the dyestuffs used according to the invention it is possible in the dyeing of textile materials consisting of, or containing, synthetic fibrous materials from organic solvents to obtain dyeings which are distinguished by a high tinctorial yield, very good built-up and outstanding fastness properties, in particular very good fastness to thermofixation, to washing, to rubbing and to light. Another advantage of the dyestuffs used is their high solubility in organic solvents, for example alcohols and in particular halogenated hydrocarbons which in some cases permits dyeing without the use of solubilizers.

The dyestuffs used according to the invention are better suitable for the dyeing from organic solvents than the phenolic starting dyestuffs ($R_1$ = H in the general formula (1)) in that they yield distinctly better dyeings. In addition, the dyeings produced with the dyestuffs used according to the invention often have a better fastness to sublimation and show a clearer and brighter shade than dyeings produced with the phenolic starting dyestuffs.

Mixture of the dyestuffs used according to the invention sometimes show a better tinctorial yield than the individual dyestuffs and in some cases also have a better solubility in the organic solvent used.

The synthetic fiber materials may be those made of high molecular polyamides, polyolefins, polyacrylonitriles, furthermore of polyurethanes, polyvinyl chlorides, polyvinyl acetates and cellulose—2½ acetate and cellulose-triacetate, in particular, however, those of high molecular polyesters such as polyethylene terephthalate. The above-mentioned textile materials may also be used in mixtures one with the other or in mixtures with natural fibers such as cellulose fibers or wool. The fiber materials may be present in any processing stages which are suitable for a continuous method of operation, for example in the form of cable, combed material, filaments, yarns, fabrics, knit fabrics or "non-woven" articles.

As organic solvents, there may be used those the boiling points of which under normal conditions are not higher than 150°C, for example aliphatic hydrocarbons such as the boiling limit benzines (DIN 51 631/I, 59), aliphatic halogenated hydrocarbons such as methylene chloride, dichloroethane, trichloroethane, tetrachloroethane, dichloro-fluoromethane, dichlorotetrafluoromethane and octafluorocyclobutane, aromatic hydrocarbons such as toluene and xylene, or aromatic halogenated hydrocarbons such as chlorobenzene and fluorobenzene. Particularly suitable are trichlorofluoromethane, 1,2,2-trichloro-1,1,2-trichloro-ethane, tetrachloroethylene, trichloroethylene and 1,1,1-trichloroethane.

Furthermore, there may be used as organic solvents alcohols, preferably aliphatic alcohols containing up to 4 carbon atoms. Mixtures of different solvents have proved advantageous. Thus, for example mixtures of halogenated aliphatic hydrocarbons and aliphatic alcohols are particularly suitable.

For preparing the padding liquors, the dyestuffs are dissolved in the solvent or mixture of solvents by stirring, if necessary with heating. The dyestuffs may be used in various forms, for example in the form without filler, in the form of a concentrated solution in one of the solvents used according to the invention or in a mixture of solvents used according to the invention or in the form of a preparation with the use of solvent-soluble auxiliary agents, for example oxalkylation products of fat alcohols, alkylene phenols, fatty acids and fatty acid amides.

The dyestuff solutions are applied in the easiest way by padding, but they can also be applied by other impregnation methods, for example spraying, nip-padding or immersion.

The impregnation is carried out preferably at room temperature, but it is also possible to operate at lower or elevated temperatures.

Prior to the fixation of the dyestuff, the textile material treated with the dyeing liquor is preferably dried, which may be effected, for example by hot air, by passing through an inert gas (such as nitrogen) or air or by the application of super-heated vapors, for example steam or solvent vapor, or under application of reduced pressure.

The dyestuffs are then fixed by the application of elevated temperatures, for example by hot air, dry heat, steam or solvent vapour.

The fixing temperatures depend on the type of the fibers and are in general between 100° and 240° C in padding processes. The heat treatment can be effected in superheated steam or in vapors of organic solvents. The fixation may also be effected by molten metals, paraffins, waxes, oxalkylation products of alcohols or fatty acids or in eutectic mixtures of salts. It is preferred, however, to carry out the fixation by dry heat, i.e., according to the so-called thermosol process. It is also possible to carry out drying and heat treatment in one working step.

The solvent vapors obtained during drying or fixing are generally recovered by suitable installations. The recovered solvents may then be used again for the described dyeing process.

If necessary, the unfixed dyestuff proportion is removed after fixation of the dyestuffs, if necessary, by a suitable after-treatment, whereby the fastness properties regarding utilization may be improved. This after-treatment is preferably carried out in the same organic solvent used for dyeing, but it may also be effected in other organic solvents or in aqueous liquors according to known methods.

The dyestuffs of the mentioned formula (1) used according to the invention are new and may be prepared according to known methods by reacting known phenolic disazo dyestuffs of the formula (1), in which, however, $R_1$, represents a hydrogen atom, in a suitable medium, for example chloroform, benzene, methylethyl ketone, dioxane or Sulfolan, with aliphatic or aromatic acid chlorides or anhydrides in the presence of an acid-binding agent, for example soda, pyridine or triethylamine.

The following Examples illustrate the invention.

EXAMPLE 1

8 Parts by weight of the dyestuff of the formula

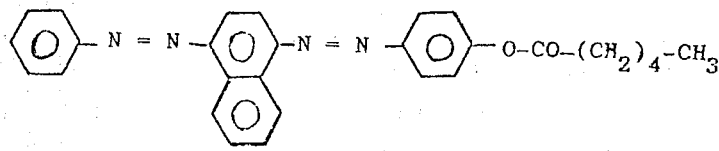

were dissolved in 1000 parts by volume of perchloroethylene at about 20° C. A fabric of polyester fibers was padded on a foulard with a squeezing effect of about 70% (weight of padding liquor referred to the weight of the goods) at room temperature with this dyestuff solution. The fabric was then dried in a suitable apparatus by removing the solvent vapors by suction. For dyestuff fixation, the fabric was subsequently thermosoled for 1 minute at 220° C. An orange brown dyeing having good fastness properties regarding utilization was obtained.

Similar results were obtained when using instead of the above-mentioned solvent the same amount of trichloroethylene.

The dyestuff had been prepared as follows:

35.2 g (0.1 mole) of the dyestuff of the formula

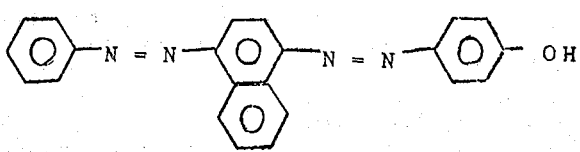

16.1 g (0.12 mole) of caproic acid chloride and 9.5 g (0.12 mole) of pyridine were heated under reflux to the boiling temperature for about 8 hours in 250 ml of chloroform. When the reaction was completed, the organic solvent was completely evaporated. The residue was dissolved in a mixture of ethanol and acetone. The dyestuff was precipitated by slowly and dropwise adding ice-water to the stirred solution. The dyestuff was filtered off with suction, washed with cold water and dried at about 50° C in a vacuum drier.

EXAMPLE 2

7 Parts by weight of the dyestuff of the formula

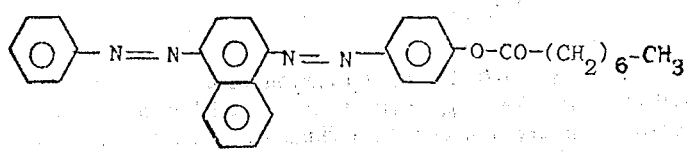

were dissolved in 1000 parts by volume of 1,1,1-trichloroethane at about 25° C. With this padding liquor, a mixed fabric of 67% of polyester fibers and 33% of cotton was padded on a foulard with a squeezing effect of about 85%. Drying and dye-stuff fixation were carried out as described in Example 1. The dyeing was then washed cold for 2 minutes in 1,1,1-trichloroethane. A fast orange dyeing was obtained on the polyester portion of the mixed fabric.

The dyestuff had been obtained by acylating the dyestuff of the formula

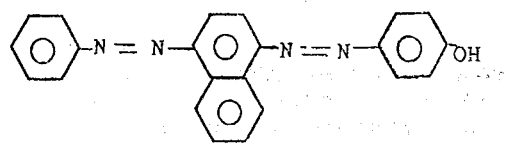

with caprylic acid chloride as acylating agent and further proceeding as described in Example 1.

EXAMPLE 3

4 Parts by weight of the dyestuff of the formula

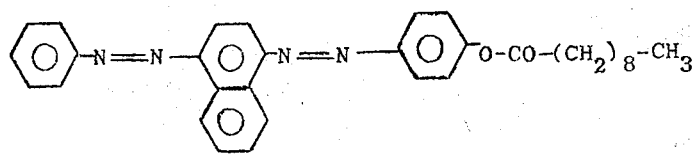

were dissolved at about 30° C in 1000 parts by volume of a mixture of 90% by volume of 1,2,2-trifluoro-trichloroethane and 10% by volume of methanol. A fabric of polyester fibers was padded on a foulard with this liquor. The squeezing effect was about 65%. Drying and dyestuff fixation was effected as described in Example 1. The dyeing was subsequently washed cold for about 5 minutes with the same solvent mixture. A fast orange dyeing was obtained.

The dyestuff had been obtained by acylating the dyestuff of the formula

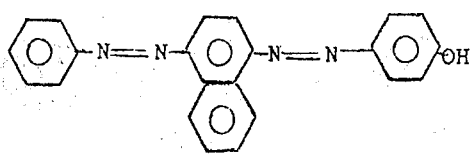

with capric acid chloride as the acylating agent and further proceeding as described in Example 1.

EXAMPLE 4

6 Parts by weight of the dyestuff used in Example 1 were dissolved at room temperature in 1000 parts by volume of perchloroethylene and applied, as described in Example 1, by padding onto the fiber materials described hereafter, dried and thermosoled under the indicated conditions:

| | |
|---|---|
| fabric of 2½-acetate fibers | 30 seconds 160°C |
| fabric of triacetate fibers | 30 seconds 170°C |
| fabric of polyamide-6,6 fibers | 40 seconds 190°C |
| yarn of polyvinyl chloride fibers (type Thermovyl) | 30 seconds 130°C |
| combed material of polypropylene fibers | 30 seconds 145°C |

The dyeings were subsequently washed cold for 5 minutes in perchloroethylene. Dependent on the fiber material used, fast yellow orange to brown orange dyeings were obtained.

EXAMPLE 5

3 Parts by weight of the dyestuff of the formula

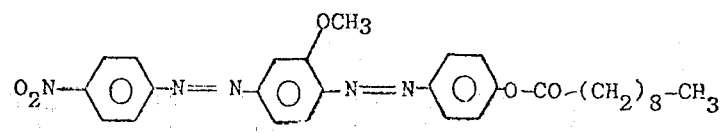

were dissolved at about 30° C in 1000 parts by volume of methanol. With this padding liquor, a fabric of polyester staple fibers was padded on a foulard with a squeezing effect of about 35%, dried and thermosoled for 1 minute at 210° C. Subsequently, the dyeing was treated cold for 5 minutes in methanol. A yellow orange dyeing having good fastness properties was obtained.

The dyestuff had been prepared as follows:

37.7 g (0.1 mole) of the dyestuff of the formula

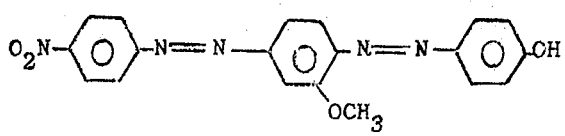

were dissolved in 250 ml of methylethyl ketone and combined with 8.0 g (0.075 mole) of soda. 28.5 g (0.15 mole) of capric acid chloride were added dropwise, while cooling well externally. The reaction mixture was heated for about 12 hours under reflux to the boiling temperature. When the reaction was completed, the organic solvent was completely evaporated, the residue was dissolved in a mixture of ethanol and acetone and the dyestuff was precipitated from the dyestuff solution by the addition of ice-water. The product was filtered off with suction, well washed with water and dried at about 50° C in a vacuum drier.

EXAMPLE 6

8 Parts by weight of the dyestuff used in Example 1 and 8 parts by weight of the dyestuff used in Example 3 were dissolved in 1000 parts by volume of perchloroethylene at about 25° C and then applied by padding (squeezing effect about 70%) onto a fabric of polyester fibers. After impregnation, the fabric was dried and subsequently thermosoled for 1 minute at 215° C. A deep orange brown dyeing having good properties of fastness was obtained.

EXAMPLE 7

3 Parts by weight of the dyestuff of the formula

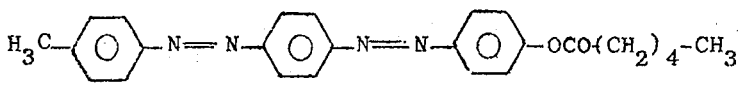

were dissolved in 1000 parts by volume of a mixture of 70% by volume of perchloroethylene and 30% by volume of methanol at about 25° C. With this solution, a fabric of polyester fibers was impregnated on a foulard. The squeezing effect was about 60%. After padding, the dyeing was dried, then thermosoled for 1 minute at 210° C and washed cold for about 5 minutes in the same solvent mixture. A yellow dyeing having good properties of fastness was obtained.

The dyestuff had been prepared as follows:
31.6 g (0.1 mole) of the dyestuff of the formula

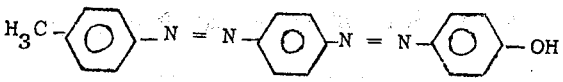

16.1 g (0.12 mole) of caproic acid chloride and 9.5 g (0.12 mole) of pyridine were heated for about 8 hours under reflux to the boiling temperature in 250 ml of chloroform. Isolation of the dyestuff was effected in the manner described in the preceding examples.

EXAMPLE 8

4 Parts by weight of the dyestuff of the formula

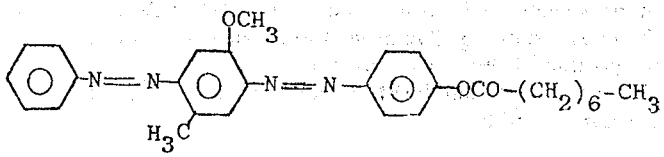

were dissolved at about 20° C in a mixture of 950 parts by volume of methylene chloride and 50 parts by volume of methanol. Combed material of polyester fibers was padded on a foulard with this liquor, with a squeezing effect of about 70%, dried and thermosoled for 1 minute at 210° C in order to fix the dyestuff. The dyeing was further treated by washing it cold for 5 minutes with perchloroethylene. A fast yellow orange dyeing was obtained.

The dyestuff had been prepared as follows:
34.6 g (0.1 mole) of the dyestuff of the formula

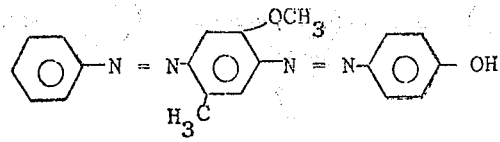

19.4 g (0.12 mole) of caprylic acid chloride and 9.5 g (0.12 mole) of pyridine were heated for about 8 hours under reflux to the boiling temperature in 250 ml of chloroform. Isolation of the dyestuff was carried out as described in the preceding examples.

EXAMPLE 9

5 Parts by weight of the dyestuff of the formula

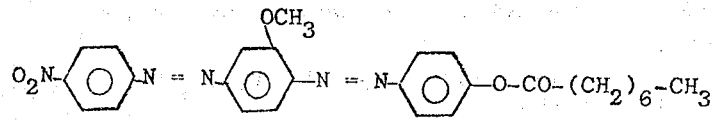

were dissolved at room temperature in 1000 parts by volume of a mixture of 50% of 1,2,2-trifluoro-trichloroethane and 50% of methylene chloride. A fabric of polyester fibers was padded on a foulard with this solution, with a squeezing effect of about 65%, dried and thermosolved for 1 minute at 210° C. The dyeing was then washed cold for about 5 minutes with the same solvent mixture. A fast orange dyeing was obtained.

Similar resulsts were obtained when using, instead of the hot air treatment, the following methods for fixing the dyestuffs: 20 minutes steaming in steam at 102° – 103° C; 5 minutes steaming in superheated perchloroethylene vapor at about 150° C.

The dyestuff had been prepared by reacting the dyestuff of the formula

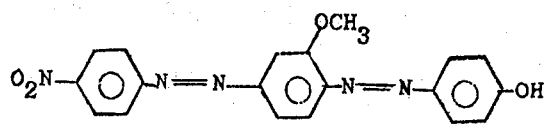

with caprylic acid chloride as the acylating agent and further proceeding as described in Example 5.

The following Table 1 indicates a selection of dyestuffs which can be used according to the described dyeing methods and yield yellow to orange dyeings on polyester fibers.

TABLE

1) 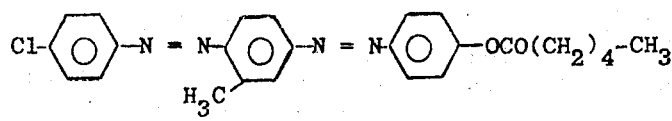

2) 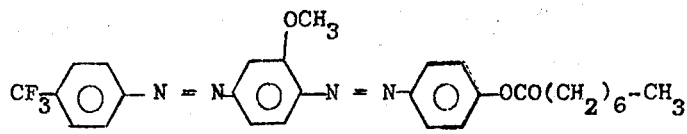

3) 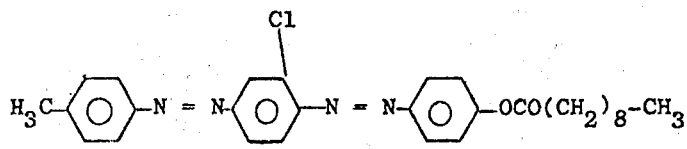

4) 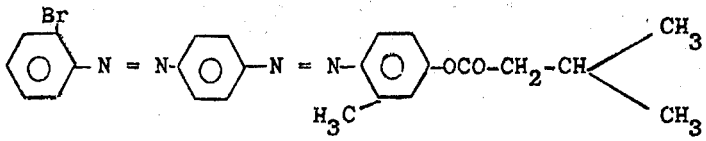

5) 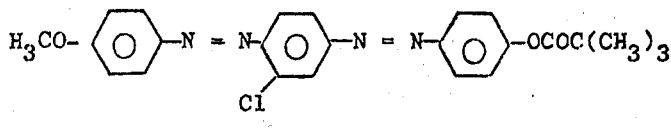

6) 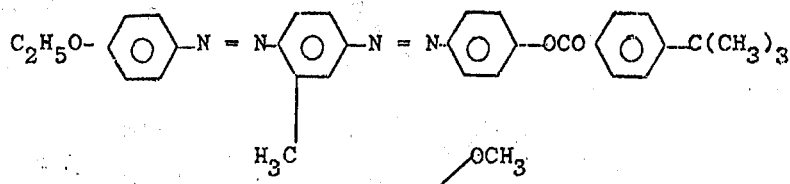

7) 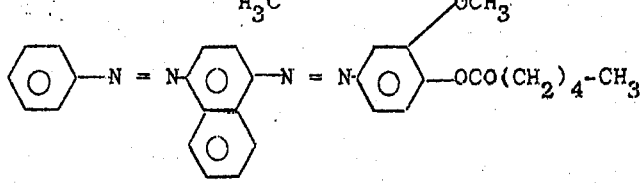

8) 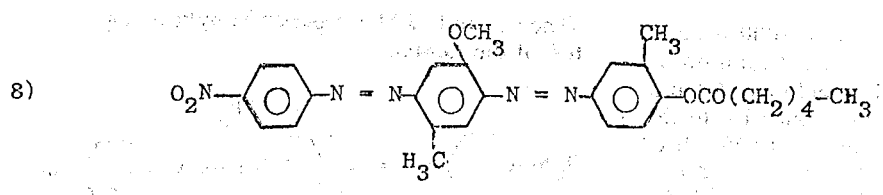
9) 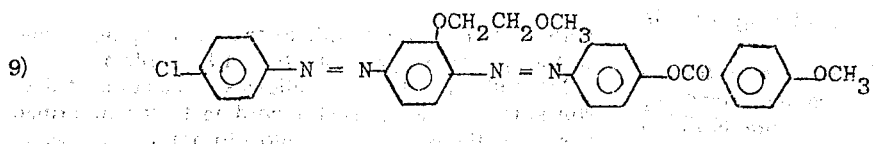
10) 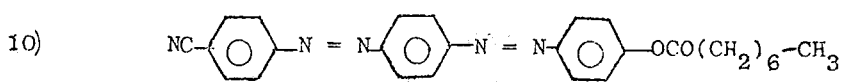
11) 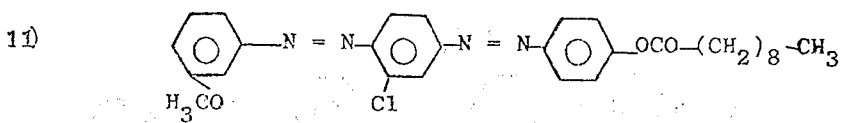
12) 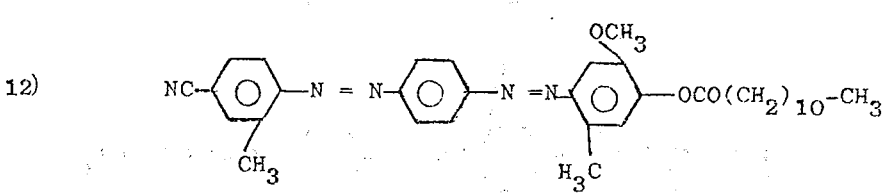
13) 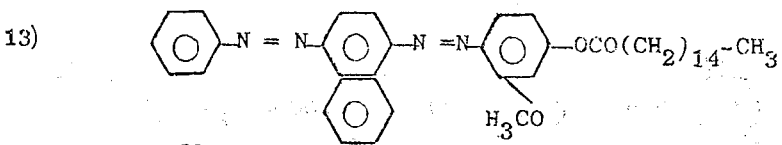
14) 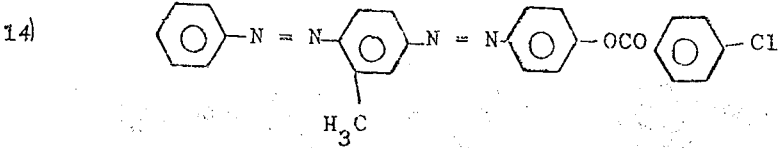
15) 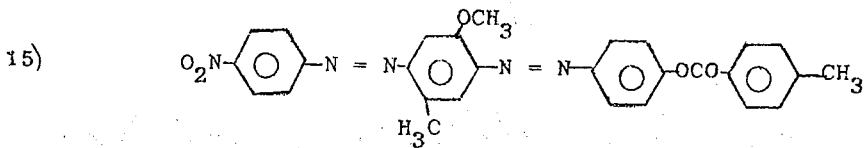
16) 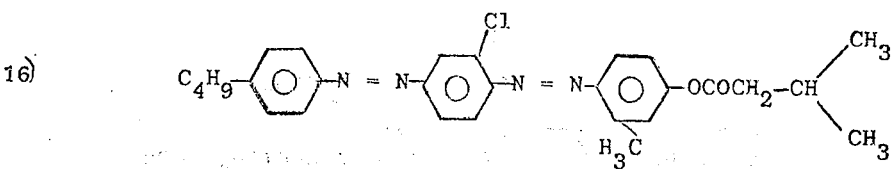
17) 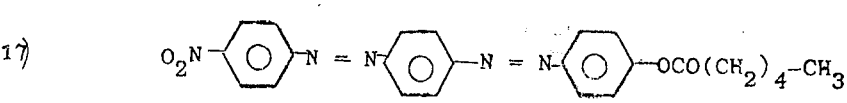

18) 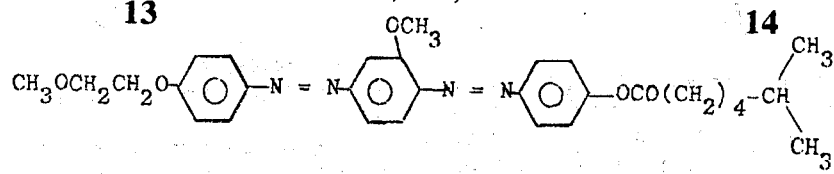
19) 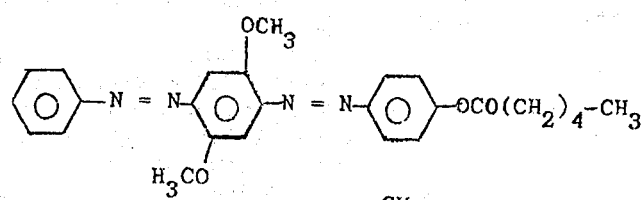
20) 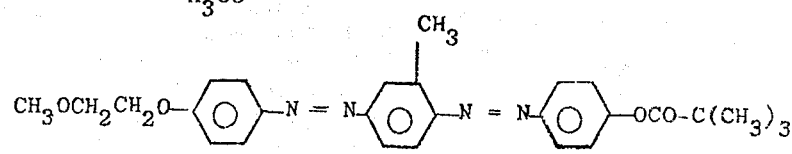
21) 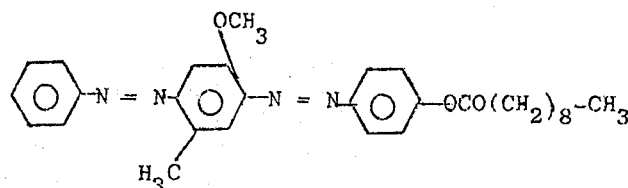
22) 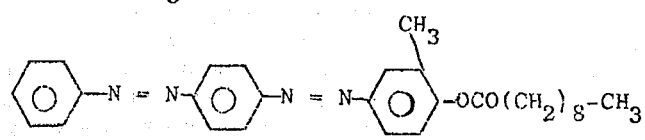
23) 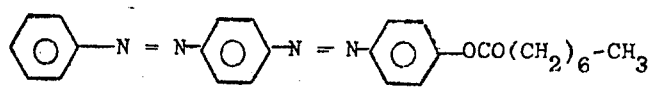
24) 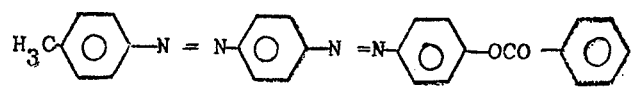
25) 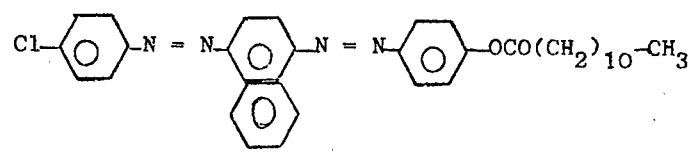
26) 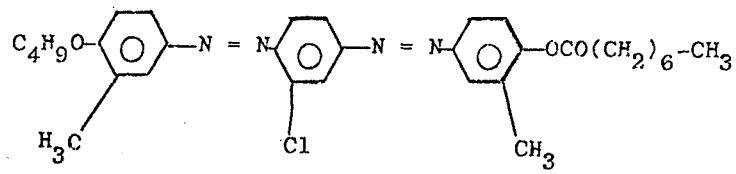

We claim:
1. A process for the continuous dyeing of textile materials containing or consisting of synthetic fibrous materials from organic solvents, which comprises impregnating the said textile materials with an organic dyebath containing at least one dyestuff of the formula

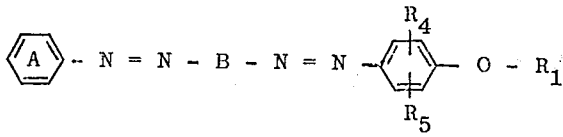

in which the phenyl radical A is unsubstituted or substituted by 1 to 3 substituents of the group consisting of halogen, nitro, cyano, trifluoromethyl, lower alkyl, lower alkoxy and lower alkoxy-lower alkylene—O—, B represents naphthylene or

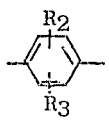

$R_2$, $R_3$, $R_4$ and $R_5$ each represent hydrogen, halogen, lower alkyl, lower alkoxy or lower alkoxy-lower alkylene—O—, and $R_1$ stands for a linear or branched alkylcarbonyl of at most 18 carbon atoms,

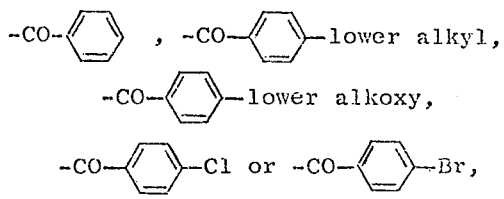

and an organic solvent, and fixing the dyestuffs by submitting the impregnated materials to a heat treatment.

2. The process as claimed in claim 1, wherein at least one halogenated hydrocarbon is used as organic solvent.

3. The process as claimed in claim 1, wherein at least one aliphatic alcohol is used as organic solvent.

4. The process as claimed in claim 1, wherein a mixture consisting of a halogenated organic hydrocarbon and an aliphatic alcohol is used as organic solvent.

5. The process as claimed in claim 1, wherein the boiling limit benzines, methylene chloride, dichloroethane, trichloro-ethane, tetrachloro-ethane, dichlorofluoromethane, dichloro-tetrafluoro-methane, octafluoro-cyclobutane, toluene, xylene, chlorobenzene, fluorobenzene, trichloro-fluoro-methane, 1,2,2-trichloro-1,1,2-trichloro-ethane, tetrachloroethylene, trichloroethylene and 1,1,1-trichloro-ethane are used as organic solvent.

6. The process as claimed in claim 1, wherein the dyeing is aftertreated in an organic solvent.

7. The process as claimed in claim 1, wherein the dyeing is aftertreated in the same organic solvent or mixture of organic solvents which had been used in the preceding dyeing process.

8. The process as claimed in claim 1, wherein a textile material consisting of or containing polyamides, polyurethanes, polyolefins, polyacrylonitriles, polyvinyl chlorides, polyvinyl acetates, cellulose—2½-acetate, cellulose-triacetate or polyethylene terephthalate is dyed.

* * * * *